April 30, 1968     J. Y. THOMAS     3,380,871
METHOD FOR MAKING PRINTABLE AND/OR GLUEABLE
POLYOLEFINIC MATERIAL
Filed Nov. 14, 1963

*INVENTOR*
JOSEPH Y. THOMAS

BY Glenn, Palmer
     & Matthews
HIS ATTORNEYS

United States Patent Office 3,380,871
Patented Apr. 30, 1968

3,380,871
METHOD FOR MAKING PRINTABLE AND/OR GLUEABLE POLYOLEFINIC MATERIAL
Joseph Y. Thomas, Henrico County, Va., assignor to Reynolds Metals Company, Richmond, Va., a corporation of Delaware
Filed Nov. 14, 1963, Ser. No. 323,836
4 Claims. (Cl. 156—308)

This invention relates to an improved polyolefinic material having at least one side thereof rendered receptive to adhesive and/or printing ink means as well as to an improved method for making such a polyolefinic material or the like.

It is well known that it is relatively difficult to laminate a polyolefinic sheet material or the like to another substrate by an adhesive because of the particular natural characteristics of the polyolefinic material.

Further, it is well known that polyolefinic material will not readily permit printing ink or the like to be printed thereon because of the natural characteristics of the polyolefinic material.

In the past, it has been attempted to render a surface of a polyolefinic material receptive to adhesive and/or printing inks by treating the desired surface of the polyolefinic material with an open flame or electrostatically.

However, it has been found that such prior known methods allow only moderate production rates because of various problems encountered in the prior known methods.

According to the teachings of this invention, however, an improved lamination is provided wherein the desired surface of a polyolefinic material is rendered readily receptive to adhesives and/or printing inks whereby the polyolefinic material is readily adaptable to form a container structure or the like.

By following the teachings of this invention, it has been found that the ink and/or adhesive receptive coating of this invention can be applied to a high production rate by any equipment suitable for printing, coating, or priming with liquids and that the resulting product has excellent retention of printability and/or glueability on aging, features heretofore unobtainable in the art.

Accordingly, it is an object of this invention to provide an improved lamination having one or more of the novel features set forth above or hereinafter shown or described.

Another object of this invention is to provide an improved method for making such a lamination or the like.

Other objects, uses and advantages of this invention are apparent from a reading of this description which proceeds with reference to the accompanying drawings forming a part thereof and wherein.

Figure 1:
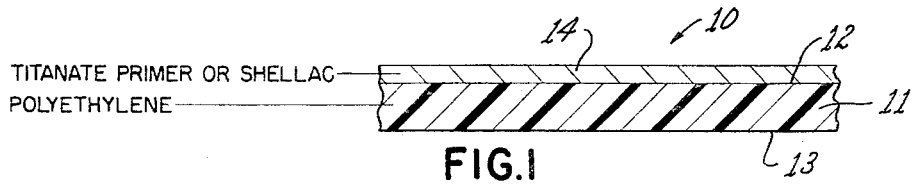
FIGURE 1 illustrates the lamination of this invention before various products are secured to the adhesive and/or printing ink receptive surface of the plastic material thereof.

While the various features of this invention are hereinafter described as being particularly adaptable for forming a lamination, it is to be understood that the various features of this invention can be utilized singly or in any combination thereof to provide any desired product.

Therefore, this invention is not to be limited to only the embodiments illustrated in the drawings, because the drawings are merely utilized to illustrate one of the wide variety of uses of this invention.

Referring now to FIGURE 1, an improved lamination of this invention is generally indicated by the reference numeral 10 and comprises a sheet of plastic material 11 having opposed sides 12 and 13, the side 12 of the sheet of plastic material 11 being rendered readily receptive to adhesives and/or printing inks by a coating 14 secured thereto in a manner hereinafter described.

For example, the plastic material 11 can comprise a polyolefin material, such as polyethylene or polypropylene and can be extruded, cast or formed in any desired manner.

After the plastic material 11 has been formed, the surfaces 12 or 13 or both thereof can be coated in any suitable manner by the coating 14 of this invention to render that particular plastic surface readily receptive to adhesives and/or printing inks.

Figure 4:
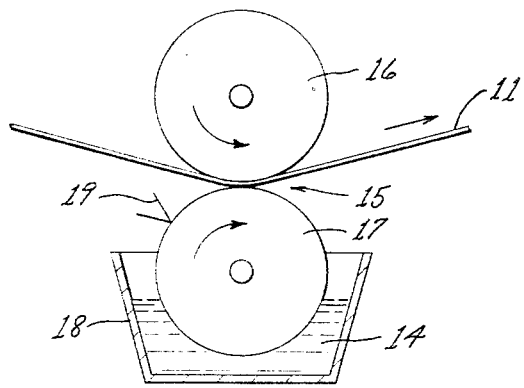
FIGURE 4 is a schematic side view illustrating one method for rendering the desired surface of a plastic material receptive to adhesives and/or printing inks.

For example, the sheet of material 11 can be fed through the nip 15 of a pair of rolls 16 and 17 in the manner illustrated in FIGURE 4 whereby the roll 17 picks up the coating 14 from a suitable reservoir 18 and applies the same to the under surface of the traveling web 11 of plastic material, a suitable doctor blade 19 being provided for the roll 17 in advance of the nip 15 thereof to cause the proper amount of coating 14 to be applied to the under surface of the web 11 of plastic material.

In this manner, it can be seen that the coating 14 can be applied by gravure means.

However, it must be understood that the coating 14 can be applied to the sheet of plastic material 11 in any desired manner, such as by spraying, by hand and the like.

Figure 5:
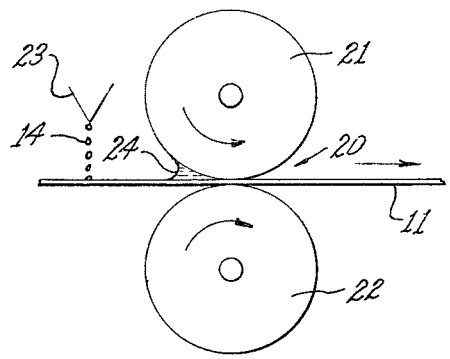
FIGURE 5 is a view similar to FIGURE 4 and illustrates another method of this invention.

For example, another method is illustrated in FIGURE 5 wherein the traveling web 11 of plastic material is fed through a nip 20 of a pair of rolls 21 and 22 rotating in a direction indicated by the arrows.

Before the web 11 of plastic material reaches the nip 20 of the rolls 21 and 22, the coating 14 is dropped onto the web 11 from a suitable reservoir 23 whereby the coating 14 forms a flooding or puddle 24 at the leading side of the nip 20 so that the pressure between the rolls 21 and 22 causes the coating 14 to be applied in the desired thickness to the web 11 of plastic material as the same passes through the nip 20 of the rolls 21 and 22.

After the sheet of plastic material 11 has the coating 14 applied thereto in any suitable manner, such as in the manner set forth in FIGURES 4 and 5, the coating 14 is dried thereon whereby the dried coated surface of the sheet of plastic material 11 is adapted to be adhesively secured to a desired substrate by a suitable adhesive or is adapted to have printing inks applied thereto in such a manner that the printing inks will be firmly secured to the dried coated surface of the sheet of plastic material 11.

For example, reference is made to FIGURE 2 wherein another lamination of this invention is generally indicated by the reference numeral 25 and is formed in the following manner.

Figure 2:
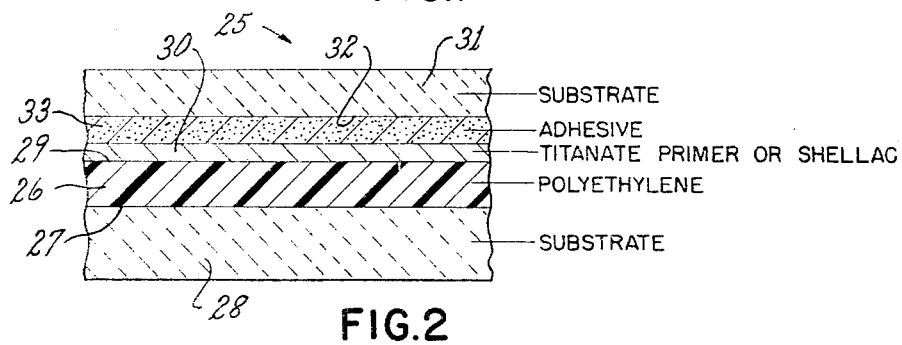
FIGURE 2 is an enlarged, exaggerated, cross-sectional view illustrating one lamination of this invention.

As illustrated in FIGURE 2, the lamination 25 comprises a sheet of polyethylene 26 having the surface 27 thereof secured to a suitable substrate sheet 28 in any suitable manner, such as by having the polyethylene extruded onto the substrate sheet 28 in a conventional manner.

However, the other surface 29 of the sheet of polyethylene 26 has the dried coating 30 of this invention applied thereto in the manner previously described to render the surface 29 of the sheet of polyethylene 26 adhesive and/or ink receptive.

Thereafter, a desired substrate sheet 31 is adapted to have the side 32 thereof secured to the dried coated surface 29 of the sheet of polyethylene 26 by a suitable adhesive layer 33 whereby the substrate sheet 31 is firmly secured to the polyethylene sheet 26 by the adhesive 33 in a manner not permitted when the adhesive 33 is applied against an uncoated surface of the sheet of polyethylene 26.

Figure 3:
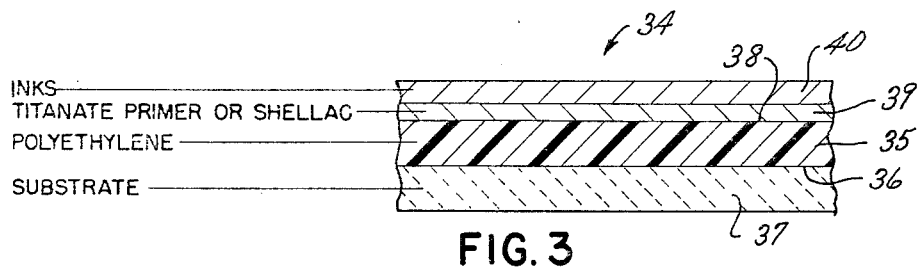
FIGURE 3 is a view similar to FIGURE 1 and illustrates another lamination of this invention.

Another lamination of this invention is generally indicated by the reference numeral 34 in FIGURE 3 and comprises a sheet of polyethylene 35 having the side 36 thereof secured to a substrate sheet 37 in any suitable manner, such as by having the polyethylene extruded or cast onto the substrate sheet 37 in a manner conventional in the art.

However, the other surface 38 of the sheet of polyethylene 35 has a dried coating 39 of this invention applied thereto in the manner previously described to render the surface 38 of the sheet of polyethylene 35 receptive to adhesives and/or printing inks.

Thereafter, suitable printing inks 40 are applied to the dried coated surface 38 of the sheet of polyethylene 35 in any conventional or suitable manner whereby the printing inks 40 are firmly secured to the dried coated surface 38 of the polyethylene sheet 35 in a manner not possible if the printing inks 40 were applied directly to an uncoated surface of the sheet of polyethylene 35.

Therefore, it can be seen that by providing the dried coating of this invention on the desired surface of the polyolefin sheet of material in any suitable manner, that surface of the polyolefin material is rendered readily receptive to adhesives and/or printing inks in a manner heretofore unobtainable in the art.

The adhesive and/or printing ink receptive coating of this invention can comprise an organic titanate primer or shallac.

For example, the organic titanate primer of this invention can comprise tetraisopropyl tetrastearyl titanate in solvent solution normally sold under the trademark "Tyzor AP."

This particular organic titanate primer comprises approximately 5.0% by weight of tetraisopropyl tetrastearyl titanates and 95.0% by weight of dried hexane. When this organic titanate primer is properly applied, the actual residue of tetraisopropyl tetrastearyl titanate deposited from the solution on the desired polyolefin surface will fall within the limits of approximately 0.05 to approximately 0.10 pound per 3000 sq. ft. of substrate surface.

The particular embodiment of the shellac coating of this invention comprises approximately 1.1% by weight of dewaxed orange shellac, approximately 1.2% by weight of 95% denatured ethyl alcohol and approximately 97.7% by weight of 95% denatured isopropyl alcohol.

If desired, approximately 0.1% by weight of phenolphthalein may be added to the shellac solution so that the presence of the shellac treatment on the polyolefin surface can be identified by the pink color produced when an alkali solution is applied.

When such a shellac solution is utilized, the actual residue of dry shellac remaining on the treated polyolefinic surface will fall within the range of approximately 0.01 to approximately 0.10 pounds per 3000 sq. ft. of substrata surface.

When the aforementioned coatings are utilized on a polyolefinic surface in the above manner and an additional substrate sheet, such as sheet 31 of FIGURE 2, is to be secured to the coated polyolefinic surface by an aqueous resin emulsion, it has been found that the bond between the substrate sheet and the polyolefin material is a relatively tight bond which will not readily flow or yield under a reasonable stress applied constantly over a period of hours or days. In other words, the bond produced by this invention is not of a pressure sensitive adhesive type of bond which will peel away under a slow steady pull but is a hard bond such as is found in carton seams, etc.

While any suitable adhesive 33 of FIGURES 2 can be utilized, it has been found that the aqueous resin emulsion known as Polybond BW–1071–R2 of Polymer Industries, Inc.; Adhesive E–1576–B of Arabol Manufacturing Company; Resyn 33–1460 of National Starch & Chemical Company; Adhesive 1635 of Southern Adhesives Corporation; and Casco NT–565 of Borden Chemical Company are satisfactory when utilized in the manner set forth in FIGURE 2 of applicant's drawings.

However, it should be noted that when an aqueous resin emulsion is utilized for the adhesive 33 of FIGURE 2, the substrate sheet 31 should be moisture pervious so that as the adhesive 33 dries, the resulting vapors thereof may escape through the substrate sheet 31 as the polyethylene sheet 26 is a vapor barrier.

Therefore, it can be seen that not only does this invention provide an improved lamination wherein a polyolefinic surface is rendered readily receptive to adhesives and/or printing inks, but also this invention provides an improved method for making such a lamination or the like.

While the form of the invention now preferred has been disclosed as required by the statutes, other forms may be used, all coming within the scope of the claims which follow.

What is claimed is:

1. A method for making a lamination comprising the steps of providing a sheet of polyethylene having opposed surfaces, disposing a coating of shellac dissolved in an aliphatic alcohol on one of said surfaces, drying said coating to render said coated surfaces receptive to adhesives, applying an adhesive to said dried coating, and securing another sheet of material to said coated surface by said adhesive.

2. A method as set forth in claim 1 wherein said coating comprises approximately 1.1% by weight of dewaxed orange shellac, approximately 1.2% by weight of 95% denatured ethyl alcohol and approximately 97.7% by weight of 95% denatured isopropyl alcohol.

3. A method for making a lamination comprising the steps of providing a sheet of polyethylene material having opposed surfaces, disposing a coating of shellac dissolved in an aliphatic alcohol on one of said surfaces, drying said coating to render said coated surface receptive to printing inks, and disposing printing ink on said coated surface.

4. A method as set forth in claim 3 wherein said coating comprises approximately 1.1% by weight of dewaxed orange shellac, approximately 1.2% by weight of 95% denatured ethyl alcohol, and approximately 97.7% by weight of 95% denatured isopropyl alcohol.

References Cited

UNITED STATES PATENTS

| | | | |
|---|---|---|---|
| 2,888,367 | 5/1959 | Greyson | 117—138.8 |
| 2,955,970 | 10/1960 | Rice et al. | 117—64 |
| 2,943,955 | 7/1960 | Brill | 117—121 |
| 2,968,576 | 1/1961 | Keller et al. | 117—47 |
| 3,017,282 | 1/1962 | Brill. | |
| 3,080,266 | 3/1963 | Haslam. | |
| 3,111,418 | 11/1963 | Gilbert et al. | 117—138.8 |
| 3,222,210 | 12/1965 | Hammond | 117—138.8 |
| 3,245,825 | 4/1966 | Fessler et al. | 117—138.8 |

OTHER REFERENCES

Murty, N. N., "Adhesives Based on Shellac and Its Derivatives," Plastics (London), vol. 9, December 1945, pp. 585, 586 and 590.

EARL M. BERGERT, *Primary Examiner.*

C. B. COSBY, *Assistant Examiner.*